United States Patent Office 2,896,387
Patented July 28, 1959

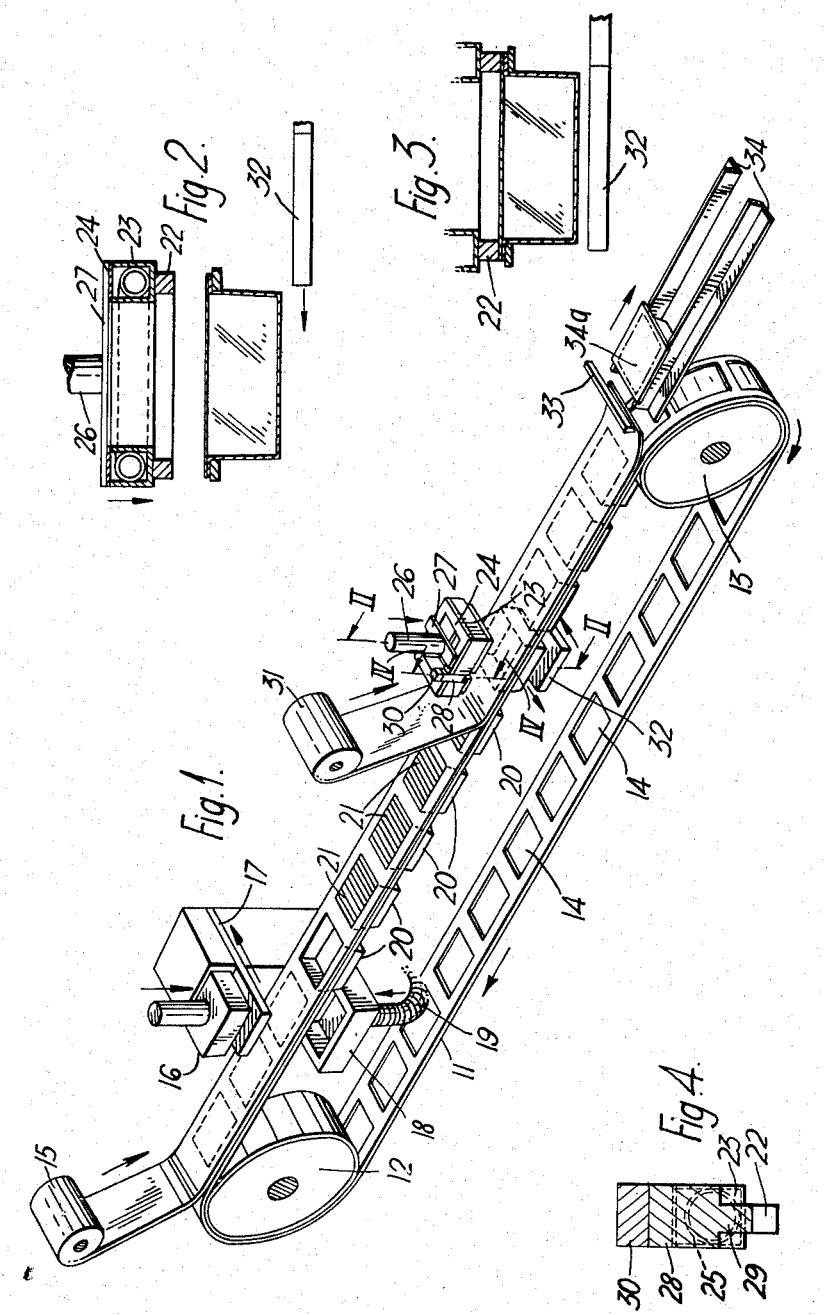

2,896,387

MACHINE FOR PACKAGING ARTICLES

Herbert William Brock, Abbotsford, near Melbourne,
Victoria, Australia

Application September 27, 1957, Serial No. 686,755

Claims priority, application Australia October 2, 1956

9 Claims. (Cl. 53—141)

In the specification of my application No. 686,754, filed September 27, 1957, now United States Letters Patent No. 2,879,635, there is described an improved method of packaging articles, especially biscuits and other food stuffs, which method comprises placing the articles in open receptacles formed of thermoplastic material in the heat-contractable state, closing the receptacles and subjecting them to heat thereby contracting them on to the contained articles.

Thermo-plastic materials may be obtained in the heat-contractable state by stretching them at temperatures such that they are softened and then cooling them until they are capable of retaining their stretched condition. The stretched condition is however an unstable one and if they are subsequently softened by heating they tend, unless restrained, to return to their original dimensions and configuration. Examples of thermo-plastic materials which behave in this manner and are therefore suitable for forming the said receptacles are polystyrene, polyvinyl chloride, polyethylene, polyvinylidene chloride, and copolymers of vinyl chloride with vinylidene chloride. Owing to its non-toxic properties a composition formed from polyvinyl chloride and an ester of cyclohexanol or a nuclear substituted cyclohexanol as described in my Australian applications 16,412/56, 16,677/56, 18,381/56 and 19,165/56, is the preferred thermoplastic material where the articles to be packed are food-stuffs.

It is an object of the present invention to provide apparatus for use in the application of said method and in accordance with the present invention there is provided apparatus for packaging articles which comprises a conveyor for feeding a first strip of thermo-plastic material through a deforming zone, a loading zone and a contracting zone, a moulding device in the deforming zone for softening successive portions of the strip when present therein and deforming them and cooling them to form the strip emerging from the deforming zone with a series of depressions which are shaped to constitute receptacles adapted to be loaded with the articles to be packaged as the strip passes through the loading zone, means for feeding a second strip of thermo-plastic material to cover the receptacles and thus enclose the articles; and, in the contracting zone, a heat sealing device for heat sealing the second strip over the receptacles and a heater for heating the receptacles and thus cause them to shrink and grip the articles.

A convenient form of conveyor is an endless band formed with apertures to accommodate the receptacles. The moulding device may be provided in any convenient form. In one convenient form it comprises a reciprocable plunger and a heater, which is preferably reciprocably mounted for movement in synchronism with the plunger, for softening said successive portions of the strip. In another convenient form it comprises a reciprocably mounted female die, a heater for softening the portions of the strip, and means for moving the softened portions into the die, e.g. a reciprocable plunger, a suction device or both.

In accordance with a preferred feature of the invention the heat sealing device consists of a reciprocable heated pressure member shaped and dimensioned to press the second strip into contact with the first strip over a pressure zone which surrounds the receptacles but leaves a short gap to act as a bentway which provides communication between the outside and the inside of said receptacles whilst said receptacles are being shrunk by the heater in the contracting zone and a second heated pressure member for pressing the second strip into contact with the first strip over said short gap after the receptacles have been shrunk. Conveniently the second heated pressure member is slidably mounted on said reciprocable heated pressure member.

A suitable form of heater for shrinking the receptacles in the contracting zone is a reciprocably mounted radiant heater. Another suitable form is a device operable to direct heated air or other gas on to the receptacles when required.

The following description in which reference is made to the accompanying drawing, is given in order to illustrate the invention.

In the drawing:

Figure 1 shows the operative parts of a packaging machine in perspective at one stage of its operative cycle.

Figure 2 is a cross-section of part of Fig. 1 taken in the direction of the arrows 2, Figure 3 is similar to Figure 2 but shows parts of the machine at a different stage of the operative cycle, and Figure 4 is a local cross-section taken in the direction of the arrow 4.

In the machine there is provided a carrier band 11 formed of metal strip mounted for travel round an idler drum 12 and a drum 13 which is driven by an intermittent mechanism (not shown). Along its length the band is formed with regularly spaced rectangular apertures 14 spaced as shown and the intermittent mechanism is so arranged that each time the belt is moved, its distance of travel is equal to the distance between the centres of adjacent apertures.

Thermo-plastic sheet material of width approximating to the width of the band 11 is drawn, by the movement of the band from a roll 15. Each aperture 14 brought in turn under, and held stationary under a heated former 16, which is provided with a coating of polytetrafluoroethylene and which is mounted for vertical reciprocation. The portion of the band beneath the former 16 is heated by a horizontally reciprocable radiant heater 17 until soft and, incidentally, sterlised. Under the upper reach of and vertically below the former 16 is vertically reciprocably mounted a mould 18 having a cavity which corresponds in shape with the former 16, which is substantially larger than said former and which at its opening is identical in size and shape with the apertures 14. This mould is moved upwardly into contact with the band whilst the material over it is being softened by the heater 17. When the material has been softened the heater 17 is withdrawn and the former 16 presses the material into the mould 18. Suction applied via a vacuum line 19 sucks the material out of contact with the former 16 and into contact with the mould 18 where it is immediately chilled to a dimensionally stable state. The mould, the former and the heater 17 are then returned to the positions in which they are shown in Fig. 1. The result of these operations is to provide a series of open box-like receptacles 20, held by the apertures 14.

The receptacles 20 are filled manually or otherwise with biscuits or other articles 21 and are brought in turn under a heat-sealing device in the form of a rectangular annulus 22 mounted on the underside of an annular box 23 formed by U-section extruded aluminum and an annular cover 24. The box is provided internally with a thermostatically controlled heater such as the tubular electric heater 25. On one side the box, which is vertically reciprocably mounted upon a rod 26 secured to a cross-piece 27, and the annulus 22 are formed with a gap having a metal plunger 28 slidably keyed therein. On its underside the plunger is formed with a projection 29 which corresponds in cross-section with the annulus 22 and on its upper side it is provided with an extension 30 of heat insulating material by which it is connected with reciprocating means (not shown) in such a manner that it retains heat absorbed from the box 23.

As they pass each receptacle under the heat-sealing device the receptacles are covered with a strip of thermo-plastic material from a roll 31. On descent of the sealing device each receptacle has its marginal portion pressed between the band 11 and the heated annulus 22. No pressure however is as yet exerted by the projection 29, the plunger being at this stage in the raised position.

Below the heat sealing device is mounted a horizontally reciprocable radiant heater 32 which now moves into position below the receptacle. Alternatively there may be employed a series of jets for directing hot air over the receptacle. As heat-sealing is taking place around the marginal portion of the receptacle, the heat applied by heater 32 causes the thermo-plastic material forming the container to shrink and thus grip the articles 21 tightly. Simultaneously air leaks from the container by passing under the projection 29. When shrinkage so complete the heater 32 is withdrawn and the plunger 28 is lowered thus rendering the heat-sealing complete all round the margin of the receptacle and rendering it completely air-tight. The heat-sealing device is raised and the belt moves to bring another receptacle thereunder.

As the machine continues to operate the sealed receptacles move onwardly in the form of a continuous band. The receptacles are raised as they pass over the driven roller 13 and separated by a cutter 33. They drop on to rails 34 down which they slide as separate articles such as 34a suitable for packing in crates, which may be of a cheap open-work pattern, for distribution.

For giving the operative parts of the machine the motions just described there may be provided any convenient arrangement. A preferred arrangement is a pneumatic arrangement with separate rams for moving the different reciprocating parts, said rams being controlled by valves actuated by cams on a common shaft linked with the driving mechanism for the drum 13.

Where the apparatus is applied to the packaging of biscuits, the biscuits are gripped so firmly on contraction of the receptacles that breakage is nearly impossible during normal handling. In fact it is often possible for a man to stand upon a package without damaging the contents. The thermo-plastic material is virtually impermeable to oxygen or moisture and is capable of maintaining the biscuits in fully saleable condition for at least a month even in such extreme climates as those of Mombassa or New Guinea or even in heated humid chambers of the type employed in testing the suitability of military equipment for use in tropical campaigns.

As the receptacle mates closely with the biscuits, only a negligible amount of gas remains if the receptacle is vented during contraction as is preferred. Steps may be taken if desired to ensure that the residual gas is wholly inert gas such as nitrogen but are usually unnecessary.

I claim:

1. Apparatus for packaging articles which comprises a conveyor for feeding a first strip of thermo-plastic material through a deforming zone, a loading zone and a contracting zone, a moulding device at said deforming zone for softening successive portions of the strip when present therein and deforming them and cooling them to form the strip emerging from the deforming zone with a series of depressions which are shaped to constitute receptacles adapted to be loaded with the articles to be packaged as the strip passes through the loading zone, means for feeding a second strip of thermo-plastic material to cover the receptacles following passage of the latter through said loading zone and thus enclose the articles, and, in the contracting zone, a heater for heating the receptacles and thus causing them to shrink and grip the articles, and a heat-sealing device for initially heat sealing the second strip over a substantial part of each of the receptacles while the remainder of each receptacle is left open to the atmosphere during shrinking of the receptacle, and then heat sealing the remainder of each receptacle.

2. Apparatus according to claim 1 in which the conveyor is an endless band formed with apertures to accommodate the receptacles.

3. Apparatus according to claim 2 in which the moulding device includes a reciprocable plunger and a heater for softening the portions of the strip.

4. Apparatus according to claim 3 in which the heater included in the moulding device is reciprocably mounted for movement in synchronism with the plunger.

5. Apparatus according to claim 1 in which the moulding device includes a reciprocably mounted female die, a heater for softening the portions of the strip, and means for moving the softened portions into the die.

6. Apparatus according to claim 5 in which said means for moving the softened portions into the die includes a reciprocable plunger, and a suction device.

7. Apparatus according to claim 1 in which the heat sealing device consists of a reciprocable heated pressure member shaped and dimensioned to press the second strip into contact with the first strip over a pressure zone which surrounds the receptacles but leaves a short gap to act as a vent through which the interior of each of said receptacles is left open to the atmosphere while said receptacles are being shrunk by the heater in the contracting zone and a second heated pressure member for pressing the second strip into contact with the first strip over said short gap after the receptacles have been shrunk.

8. Apparatus according to claim 7 in which the second heated pressure member is slidably mounted on said reciprocable heated pressure member.

9. Apparatus according to claim 7 in which the heater in the contracting zone is a reciprocably mounted radiant heater.

References Cited in the file of this patent

UNITED STATES PATENTS

| 2,597,041 | Stokes | May 20, 1950 |
| 2,530,306 | Land | Nov. 14, 1950 |
| 2,546,059 | Cloud | Mar. 20, 1951 |
| 2,549,122 | Osterhof | Apr. 17, 1951 |
| 2,549,123 | Osterhof | Apr. 17, 1951 |
| 2,736,150 | Loew | Feb. 28, 1956 |